3,584,029
PROCESS FOR THE PRODUCTION OF LOWER SATURATED ALIPHATIC NITRILES
Naoya Kominami, Tokyo, Hitoshi Nakajima, Ageo-shi, and Nobuhiro Tamura, Tokyo, Japan, assignors to Asahi Kasei Kogyo Kabushiki Kaisha, Osaka, Japan
No Drawing. Filed Apr. 9, 1968, Ser. No. 719,837
Int. Cl. C07c *121/04*
U.S. Cl. 260—465.3                                                5 Claims

ABSTRACT OF THE DISCLOSURE

The production of lower saturated aliphatic nitriles (i.e. propionitrile, isobutyronitrile and normal butyronitrile) by subjecting a gas mixture containing a lower aliphatic olefin (i.e. ethylene or propylene) and hydrogen cyanide to catalytic addition reaction at a temperature of from 100 to 600° C. in the presence of, as catalyst, at least one compound selected from nickel metal, nickel chloride, nickel bromide, nickel iodide, nickel oxalate, nickel acetate, nickel cyanate, nickel thiocyanate, nickel sulfate and nickel nitrate and at least one compound selected from phosphoric acid, pyrophosphoric acid and phosphorus pentoxide.

---

This invention relates to a process for producing lower saturated aliphatic nitriles (i.e. propionitrile, isobutyronitrile or normal butyronitrile or a mixture of isobutyronitrile and normal butyronitrile) in high yields and at high selectivity by passing a gas containing a lower olefinic hydrocarbon (i.e. ethylene or propylene) and hydrogen cyanide over a catalyst to effect catalytic addition reaction at elevated temperatures.

Processes hitherto proposed for producing lower saturated aliphatic nitriles from lower olefinic hydrocarbons and hydrogen cyanide include a process carried out in the liquid phase under a high pressure using cobalt carbonyl as a catalyst (J. Am. Chem. Soc. 76, 5364); a process carried out in the gas phase using active alumina or the like as a catalyst (U.S. Pat. No. 2,455,995); a process carried out in the gas phase at an elevated temperature of from 475 to 700° C. using a noble metal of Group VIII as a catalyst (U.S. Pat. No. 3,057,906); and a process using nickel or cobalt metal or a cyanide thereof as a catalyst (U.S. Pat. No. 3,278,575 and British Pat. No. 687,014).

Of the above processes, the process using cobalt carbonyl as a catalyst suffers from the drawbacks that the catalyst is required in large amount and is deactivated in each single operation, and the regeneration of the catalyst is difficult and expensive. The process using active alumina or the like as a catalyst is not only low in selectivity as well as in catalyst activity, but is not applicable to the reaction of ethylene with hydrogen cyanide. The process of U.S. Pat. No. 3,057,906 using a noble metal of Group VIII is markedly low in selectivity and yield, acetonitrile being by-produced in large quantities. In the process using nickel or cobalt metal or a cyanide thereof as a catalyst, the catalyst is quickly lowered in activity and cannot be regenerated with ease.

According to the present invention the process for producing lower saturated aliphatic nitriles comprises subjecting a gas containing a lower aliphatic olefin selected from the group consisting of ethylene and propylene, and hydrogen cyanide to catalytic addition reaction at a temperature of from 100 to 600° C. in the presence of, as catalyst, nickel and/or at least one of the compounds of nickel compounds and at least one of the compounds of phosphoric acid (as hereinafter defined).

As used herein, the term "high selectivity" means that in the product the proportion of the desired lower saturated nitrile produced from the starting olefin (propionitrile from ethylene and isobutyronitrile and normal butyronitrile from propylene) is high in relation to by-products such as acetonitrile.

Table 1 below shows a comparison in catalyst activity and lowering in catalyst activity between the case where the catalyst is prepared by incorporation of the phosphoric acid and the case where no phosphoric acid is incorporated.

TABLE 1

| | | | | | First procedure | | | | Tenth procedure [2] | | | |
| | | | | | Mol percent | | | | Mol percent | | | |
| Experiment No. | Amount of phosphoric acid (mol percent/ Ni) | Reaction temperature (° C.) | C₂H₄/HCN (volume ratio) | Space velocity [1] (hr.⁻¹) | C₂H₄ conversion in initial period | HCN conversion in initial period | Propionitrile selectivity based on HCN | Half life period of catalyst activity (hr.) | C₂H₄ conversion in initial period | HCN conversion in initial period | Propionitrile selectivity based on converted HCN | Half life period of catalyst activity (hr.) |
| --- | --- | --- | --- | --- | --- | --- | --- | --- | --- | --- | --- | --- |
| 1 | 0 | 400 | 60/8 | 40,800 | 5.0 | 39.7 | 87.1 | 0.9 | 1.7 | 13.3 | 88.5 | 0.75 |
| 2 | 100 | 400 | 60/8 | 40,800 | 2.9 | 20.0 | 92.2 | 3.2 | 2.0 | 15.4 | 92.4 | 3.0 |
| 3 | 200 | 400 | 60/8 | 40,800 | 2.2 | 16.9 | 94.3 | 3.5 | 2.0 | 14.9 | 94.0 | 3.1 |

[1] The catalyst activity was observed to be very small in all cases due to the use of a small amount of catalyst in order to promptly observe the lowering in catalyst activity.
[2] The reaction was continued for 2 hours, then the catalyst used was treated at 400° C. with air for 15 minutes and subsequently with hydrogen for 45 minutes. This procedure was repeated 10 times. The catalyst activity is inversed between Experiment No. 1 and Experiments Nos. 1 and 2 at the tenth procedure.
NOTE.—The catalysts were prepared in the same manner as in Example 1 using 2.3 g. of nickel nitrate per 100 ml. of active alumina.

As seen in Table 1, the incorporation of phosphoric acid greatly increases the half life period of the catalyst activity and improves the selectivity. The very smallness of lowering in catalyst activity reduces the number of times of the regeneration operation accompanying wearing of catalyst. When the catalyst activity per catalyst is viewed from a long period, the yield of nitrile per catalyst increases.

Examples of compounds of nickel which may be used are halides such as chloride, bromide and iodide, carboxylates such as formate, oxalate and acetate, cyanide, thiocyanate, sulfate and nitrate.

The phosphoric acid may be phosphoric acid itself, pyrophosphoric acid and phosphorus pentoxide, and the term "phosphoric acid" as used herein embraces all these compounds. The amount of the phosphoric acid to be incorporated in the catalyst is in the range from 1 to 500%, preferably 5 to 400% based on the mole of nickel.

The catalyst may be prepared by any of the conventional methods such as immersing or mixing. The use of a carrier is not essential but is preferable. Examples of carriers are active carbon, alumina, silica alumina, titania, silica, boria and alumina boria.

The molar ratio of ethylene or propylene to hydrogen cyanide may be at or about the stoichiometric ratio (1:1), or one of them may be used in excess. Generally, however, a molar ratio within the range of from 20:1 to 1:20 is adopted.

The temperature adopted in the present invention is 100 to 600° C., preferably 200 to 450° C.

The gas may be diluted with an inert gas such as nitrogen, methane or ethane, but this is not essential.

The process of the present invention is preferably carried out at atmospheric pressure but may be carried out under superatmospheric pressure.

When lowering in catalyst activity is observed in practicing the present invention, the catalyst is heated at a temperature of from 200 to 600° C. while introducing oxygen or a gas containing molecular oxygen such as air, subsequently hydrogen, whereby the catalyst activity is easily restored.

As for the reactor utilized in the present invention, it is only desired to maintain the outlet of the reactor at a temperature of from 200 to 600° C. and other special improvements of the reactor is not required.

The catalyst may be employed in the form of a fixed bed, movable bed or fluidized bed.

This invention will be illustrated by the following examples which are in no way limiting upon the scope thereof.

EXAMPLE 1

6.0 g. of nickel nitrate was dissolved in pure water. To the solution, 2.0 g. of phosphoric acid was added, then 70 g. (=100 ml.) of 8 to 14 mesh of granular active alumina was added, and the mixture was evaporated to dryness on a hot water bath to provide a catalyst. 3.5 g. (=5 ml.) of this catalyst was charged into a vertical-type reactor of heat-resistant glass of 9 mm. outside diameter which had been placed in a niter (potassium nitrate-sodium nitrate) bath maintained at 350° C., and hydrogen was passed into the catalyst for one hour. Subsequently, a gas mixture consisting of ethylene, hydrogen cyanide and nitrogen at a volume ratio of 5:2:5 was passed through at a space velocity of 890 hr.$^{-1}$. 97.7% of the fed hydrogen cyanide was converted, and 92.0% of the converted hydrogen cyanide was propionitrile over 30 minutes after the starting of reaction. The half life period of catalyst activity was 8 hours while that was 1.5 hours in the case where no phosphoric acid was incorporated.

Over 8 hours after the starting of reaction, the process was stopped and the catalyst was heated at 400° C. while introducing air for 3 hours and subsequently hydrogen for one hour. The reaction was reopened utilizing the regenerated catalyst under the same conditions as above-described and over 30 minutes after the reopening of reaction 97.6% of the fed hydrogen cyanide was converted, and 92.1% of the converted hydrogen cyanide was propionitrile.

EXAMPLE 2

In Table 2 there are shown the methods for the preparation of the various kinds of nickel compounds, the conditions of pretreating the catalysts and the results. Unless expressly stated to the contrary, the immersion method with an aqueous solution of example was employed and the reactor was the same as in Example 1.

TABLE 2

| Nickel compound | Phosphoric acid | Carrier | Pretreatment with hydrogen | Inlet gas (volume ratio) Olefin | Inlet gas (volume ratio) Hydrogen cyanide | Inlet gas (volume ratio) Diluent | Reaction temperature (° C.) | Space velocity (hr.$^{-1}$) | Hydrogen cyanide conversion [1] | Produced nitrile and selectivity based on converted hydrogen cyanide | Half life period of catalyst activity and that incorporated with no phosphoric acid (hr.) |
|---|---|---|---|---|---|---|---|---|---|---|---|
| Nickel chloride (2.6 g.). | Phosphoric acid (4.0 g.). | Alumina, 100 ml. (70 g.). | 350° C., 2 hrs. | [3] 3 | 1 | [4] 2 | 350 | 1,800 | 98.2 | Propionitrile (98.2). | 4.5 (1.0) |
| Nickel bromide (4.4 g.). | Pyrophosphoric acid (1.7 g.). | Silica-alumina, 100 ml. (75 g.). | 350° C., 2 hrs. | [3] 2 | 1 | -------- | 350 | 1,800 | 57.4 | Propionitrile (85.3). | 5.0 (2.0) |
| Do [5] | Phosphoric acid (2.0 g.). | Aluminaboria, 100 ml. (75 g.). | ---------- | [3] 4 | 1 | [6] 6 | 300 | 3,300 | 81.5 | Propionitrile (90.0). | 3.5 (0.5) |
| Nickel iodide [7] (6.2 g.). | ----do---- | Silica, 100 ml. (65 g.). | 400° C., 1 hr. | [3] 3 | 2 | [4] 5 | 400 | 300 | 24.6 | Propionitrile (80.6). | 5.0 (2.0) |
| Nickel cyanide (2.2 g.). | Phosphoric acid (1.0 g.). | Alumina, 100 ml. (70 g.). | ---------- | [3] 4 | 1 | [8] 6 | 350 | 3,300 | 79.5 | Propionitrile (94.6). | 5.3 (1.65) |
| Nickel acetate (7.0 g.). | Phosphorus pentoxide (2.8 g.). | ---------- | ---------- | [9] 5 | 2 | -------- | 380 | 2,100 | 14.6 | Isobutyronitrile 51.8. Normal butyronitrile (34.0). | 0.8 (0.57) |
| Nickel acetate (3.5 g.). | Pyrophosphoric acid (3.4 g.). | Active carbon, 100 ml. (55 g.). | ---------- | [3] 10 | 3 | -------- | 420 | 780 | 73.3 | Propionitrile (92.8). | 16.5 (1.8) |
| Nickel formate (3.0 g.). | Phosphoric acid (0.5 g.). | Titania, 100 ml. (80 g.). | ---------- | [3] 3 | 1 | [4] 2 | 400 | 1,800 | 58.6 | Propionitrile (85.6). | 3.5 (1.52) |
| Nickel oxalate (2.9 g.). | Phosphorus pentoxide (2.8 g.). | Alumina, 100 ml. (70 g.). | 280° C., 1 hr. | [9] 5 | 2 | -------- | 280 | 1,800 | 47.0 | Isobutyronitrile (60.1). Normal butyronitrile (29.2). | 6.0 (1.0) |
| Nickel nitrate (3.1 g.). | Phosphoric acid (2.0 g.). | Active carbon 100 ml. (55 g.). | 370° C., 2 hrs. | [3] 5 | 2 | -------- | 370 | 2,100 | 98.6 | Propionitrile (95.9). | 12.0 (2) |
| Nickel sulfate (4.5 g.). | Phosphoric acid (1.0 g.). | ----do---- | ---------- | [3] 2 | 2 | [6] 5 | 350 | 1,350 | 24.1 | Propionitrile (90.3). | 1.3 (0.52) |
| Nickel [10] thiocyanate (3.8 g.). | Phosphoric acid (2.0 g.). | Alumina, 100 ml. (70 g.). | 400° C., 1 hr. | [3] 10 | 3 | -------- | 410 | 780 | 65.9 | Propionitrile (91.6). | 13.5 (2.0) |

[1] Conversion over 30 minutes after the starting of reaction.
[2] Half life period over 8 hours after the starting of reaction.
[3] Ethylene.
[4] Nitrogen.
[5] Immersion method with an ethylene glycol solution.
[6] Ethane.
[7] Immersion method with an acetone solution.
[8] Methane.
[9] Propylene.
[10] Immersion method with an acetone solution containing ammonium thiocyanate.

What is claimed is:

1. A process for producing lower saturated alkyl nitriles which comprises subjecting a gas mixture containing a lower olefin selected from the group consisting of ethylene and propylene, and hydrogen cyanide to catalytic addition reaction at a temperature of from 100 to 600° C. in the presence of, as catalyst, at least one compound selected from the group consisting of nickel metal, nickel chloride, nickel bromide, nickel iodide, nickel oxalate, nickel acetate, nickel cyanate, nickel thiocyanate, nickel sulfate and nickel nitrate and at least one compound selected from the group consisting of phosphoric acid, pyrophosphoric acid and phosphorus pentoxide.

2. The process of claim 1 wherein the mole ratio of the lower olefin to hydrogen cyanide is in the range of from 20:1 to 1:20.

3. The process of claim 1 wherein the catalyst is supported on a carrier selected from the group consisting of active carbon, alumina, silica, silica-alumina, titania, boria and alumina-boria.

4. The process of claim 1 wherein the reaction is effected in the presence of an inert gas selected from the group consisting of nitrogen, methane and ethane.

5. The process of claim 1 wherein the catalyst employed is one whose activity has been lowered in previous use and which has been regenerated by heating it at a temperature of from 200 to 600° C. in a stream of a gas selected from the group consisting of oxygen and a molecular oxygen-containing gas and subsequently in a stream of hydrogen.

References Cited

UNITED STATES PATENTS

| | | | |
|---|---|---|---|
| 3,496,217 | 2/1970 | Drinkard, Jr., et al. | 260—465.3 |
| 3,278,575 | 10/1966 | Davis et al. | 260—465.3 |
| 3,282,981 | 11/1966 | Davis | 260—465.3 |
| 3,297,742 | 1/1967 | Monroe, Jr., et al. | 260—465.3 |
| 3,407,223 | 10/1968 | Kominami et al. | 260—465.3 |

JOSEPH P. BRUST, Primary Examiner